United States Patent
Chen et al.

(10) Patent No.: US 7,661,128 B2
(45) Date of Patent: Feb. 9, 2010

(54) SECURE LOGIN CREDENTIALS FOR SUBSTANTIALLY ANONYMOUS USERS

(75) Inventors: Kai Chen, Sunnyvale, CA (US); Shioupyn Shen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 824 days.

(21) Appl. No.: 11/096,432

(22) Filed: Mar. 31, 2005

(65) Prior Publication Data

US 2006/0225130 A1    Oct. 5, 2006

(51) Int. Cl.
*H04L 9/32* (2006.01)
*G06K 9/00* (2006.01)

(52) U.S. Cl. .............................. 726/5; 726/14; 713/158

(58) Field of Classification Search .................. 726/15, 726/2, 4, 5, 7, 8, 14, 10; 713/158, 156, 183, 713/184; 709/203
See application file for complete search history.

(56) References Cited

U.S. PATENT DOCUMENTS

| | | | |
|---|---|---|---|
| 5,732,137 A | 3/1998 | Aziz | |
| 5,923,842 A * | 7/1999 | Pedersen et al. | 726/8 |
| 6,442,687 B1 | 8/2002 | Savage | |
| 6,898,710 B1 * | 5/2005 | Aull | 713/182 |
| 7,013,290 B2 * | 3/2006 | Ananian | 705/27 |
| 7,418,597 B2 * | 8/2008 | Thornton et al. | 713/175 |
| 2003/0014631 A1 | 1/2003 | Sprague | |
| 2003/0033545 A1 * | 2/2003 | Wenisch et al. | 713/202 |
| 2003/0084165 A1 | 5/2003 | Kjellberg | |
| 2003/0188201 A1 | 10/2003 | Venkataramappa | |
| 2003/0204732 A1 | 10/2003 | Audebert et al. | |
| 2003/0210789 A1 | 11/2003 | Farnham | |
| 2004/0088542 A1 * | 5/2004 | Daude et al. | 713/156 |
| 2004/0090972 A1 * | 5/2004 | Barrett et al. | 370/401 |
| 2004/0128259 A1 * | 7/2004 | Blakeley et al. | 705/74 |
| 2004/0162871 A1 * | 8/2004 | Pabla et al. | 709/201 |
| 2004/0177281 A1 * | 9/2004 | Balaz et al. | 713/202 |
| 2004/0197759 A1 * | 10/2004 | Olson | 434/322 |
| 2005/0044350 A1 * | 2/2005 | White et al. | 713/151 |
| 2005/0066035 A1 * | 3/2005 | Williams et al. | 709/226 |
| 2005/0066171 A1 * | 3/2005 | Simon | 713/175 |
| 2005/0193198 A1 * | 9/2005 | Livowsky | 713/168 |
| 2005/0209975 A1 * | 9/2005 | So et al. | 705/71 |

(Continued)

FOREIGN PATENT DOCUMENTS

EP    00851335 A2    7/1998

(Continued)

OTHER PUBLICATIONS

Parker, Tim "A VPN can perch on many protocols" Dec. 1, 1999, vol. 12, ISS 23 pp. 20.*

(Continued)

*Primary Examiner*—Eleni A Shiferaw
(74) *Attorney, Agent, or Firm*—Fish & Richardson P.C.

(57) ABSTRACT

Methods and apparatus for secure communications. The techniques feature receiving over the first connection a login credential for the server, generated by the server without the use of any information identifying a computer user. The techniques further feature establishing a second secure connection with the server using a secure protocol and the login credential provided by the server.

15 Claims, 4 Drawing Sheets

U.S. PATENT DOCUMENTS

| | | | |
|---|---|---|---|
| 2005/0246779 A1 | 11/2005 | Yegin | |
| 2006/0155985 A1* | 7/2006 | Canard et al. | 713/156 |
| 2006/0168149 A1* | 7/2006 | Dispensa | 709/219 |
| 2006/0225130 A1* | 10/2006 | Chen et al. | 726/5 |
| 2006/0280191 A1* | 12/2006 | Nishida et al. | 370/401 |

FOREIGN PATENT DOCUMENTS

| | | |
|---|---|---|
| WO | WO 2004047362 | 6/2004 |
| WO | WO 2004059588 | 7/2004 |
| WO | WO 2005086411 | 9/2005 |

OTHER PUBLICATIONS

International Search Report and Written Opinion, PCT/US2007/074129, mailed Feb. 12, 2008, 11 pages.

International Preliminary Report on Patentability, PCT/US2007/074129, mailed Feb. 5, 2009, 7 pages.

* cited by examiner

SECURE LOGIN CREDENTIALS FOR SUBSTANTIALLY ANONYMOUS USERS

BACKGROUND

This invention relates to communications between computers on a network, and more particularly to the security and privacy of those communications.

With the rapid growth of the Internet, as well as the proliferation of portable notebook computers and other portable computing devices, such as personal digital assistants (PDAs), there is a great demand for Internet connectivity any time, at any place. One way in which users can connect to the Internet is over wireless access points, such as IEEE 802.11 hotspot networks. Although wireless access points can be installed anywhere there is a wired connection to the Internet, including in homes and offices, there are a growing number of wireless access points installed in public facilities, such as hotels, libraries, and coffeehouses. Notebook computers and other portable computing devices that contain the necessary hardware can connect to the Internet through one of these wireless access points.

One concern with the use of public wireless access points is the security and the privacy of the communications between the user and the wireless access point. These communications occur over radio waves, which means that anyone with appropriate equipment can receive these communications. A common solution is to encrypt the communications between the user and the wireless access point, so that even if a third party managed to receive the communications, the third party is unable to determine the content of the communications.

Traditional encryption schemes either require that both parties know a common encryption key, or the use of a certificate-based public/private key system. Although a shared encryption key is acceptable in a home or office environment, where the users of a wireless access point are known in advance, such a system is not secure when used in conjunction with publicly accessible wireless access points. Even if it is possible to supply the same encryption key to every potential user, the security of the encrypted communications is compromised, since multiple users have access to the encryption key and can decrypt the communications. On the other hand, a public/private key system requires every user be given a certificate, and it is computationally intensive to encrypt and decrypt large volumes of data.

Besides the concern of wireless communication between the user and the access point, another concern with the use of a public access point is the credibility of the access point's provider, i.e., whether the provider is trustworthy or not. For example, a malicious provider may install a "rogue" public access point and sniff user's packets at the access point. In this case, user's data privacy is compromised even if the wireless communication itself is secure.

To solve the above-mentioned problem, a user may connect to a virtual private network (VPN) server at a trusted organization, such as the user's corporate headquarter. All data communication to the VPN server is encrypted from the user to the VPN server, and therefore a malicious access point provider cannot overhear the content of the communication. In a traditional corporate VPN scenario, the user and the VPN server must know each other and have established a shared username and password in advance.

SUMMARY

The present invention provides methods and apparatus that implement techniques for communications in a distributed software system.

In one general aspect, the techniques feature receiving over the first connection a login credential for the server, generated by the server without the use of any information identifying a computer user. The techniques further feature establishing a second secure connection with the server using a secure protocol and the login credential provided by the server.

The invention can be implemented to include one or more of the following advantageous features. The login credential may be a randomly generated username and a randomly generated password. The login credential may be assigned a set expiration time. The second secure connection may be terminated at the expiration time. The login credential may not be used to establish a connection after the expiration time. The expiration time may be contained in the login credential and protected by a digital signature of the server. The login credential may be used a predetermined number of times, and the number of times may be contained in the login credential. The number of times may be protected by a digital signature of the server. The login credential may be purchased. The first connection may be a secure connection, and the secure connection may be established using a transport layer security (TLS) or secure sockets layer (SSL) tunnel. The server may be a virtual private network (VPN) server, and the VPN server protocol may use Point-to-Point Tunneling Protocol (PPTP). The login credential may be valid to establish the second secure connection for only one time.

In another general aspect, the techniques feature receiving a first request from a client to establish a first secure connection with the client. The techniques further feature establishing the first secure connection with the client. The techniques also feature transmitting to the client over the first secure connection a login credential, generated without reference to any client identifying information, receiving a second request from the client to establish a second secure connection with the client; and establishing a second secure connection with the client.

The invention can be implemented to include one or more of the following advantageous features. The secure connection may be established using a transport layer security (TLS) tunnel or a secure sockets layer (SSL) tunnel. The second request may include the login credential. The second request may be encrypted using an encryption key derived from the login credential. The login credential may comprise a randomly generated username and a randomly generated password. The login credential may be assigned a set expiration time. A purchase of the login credential may be verified.

In another general aspect, the techniques feature receiving in a user computer a certificate from a virtual private network (VPN) server, and establishing a first secure connection with the VPN server using a Transport Layer Security (TLS) protocol based on the certificate provided by the VPN server. The techniques also feature receiving over the first secure connection from the VPN server a username and password to login to the VPN server, the username and password having been generated by the VPN server and without any identifying information provided to the VPN server. The techniques further feature calculating a secret encryption key based on the username and password, and establishing a second secure connection with the VPN server using a Point-to-Point Tunneling Protocol (PPTP) tunnel based on the username and password and the secret encryption key. The techniques also feature logging in to the VPN server over the second secure connection using the username and password.

In another general aspect, the techniques feature establishing a first secure connection with a user computer using a Transport Layer Security (TLS) protocol, and sending over the first secure connection to the user computer a username and password, without use of any identifying information identifying a computer user. The techniques also feature receiving a login request containing the username and password from the user, and establishing a second secure connection with the user using a Point-to-Point Tunneling Protocol (PPTP) tunnel based on the username and password.

Particular embodiments of the invention can be implemented to realize one or more of the following advantages. A login credential, such as a username and password, can be assigned to each user without any knowledge of the identity of the user. A secure connection can be established between a user and a server where the identity of the user is not known in advance. A user's usage of the server/service can be controlled for billing and other purpose through control over the distribution of the login credential. The login method can provide a security wrapper for an otherwise non-secure anonymous service. The login method can provider a billing wrapper for many services.

One implementation of the invention provides all of the above advantages.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
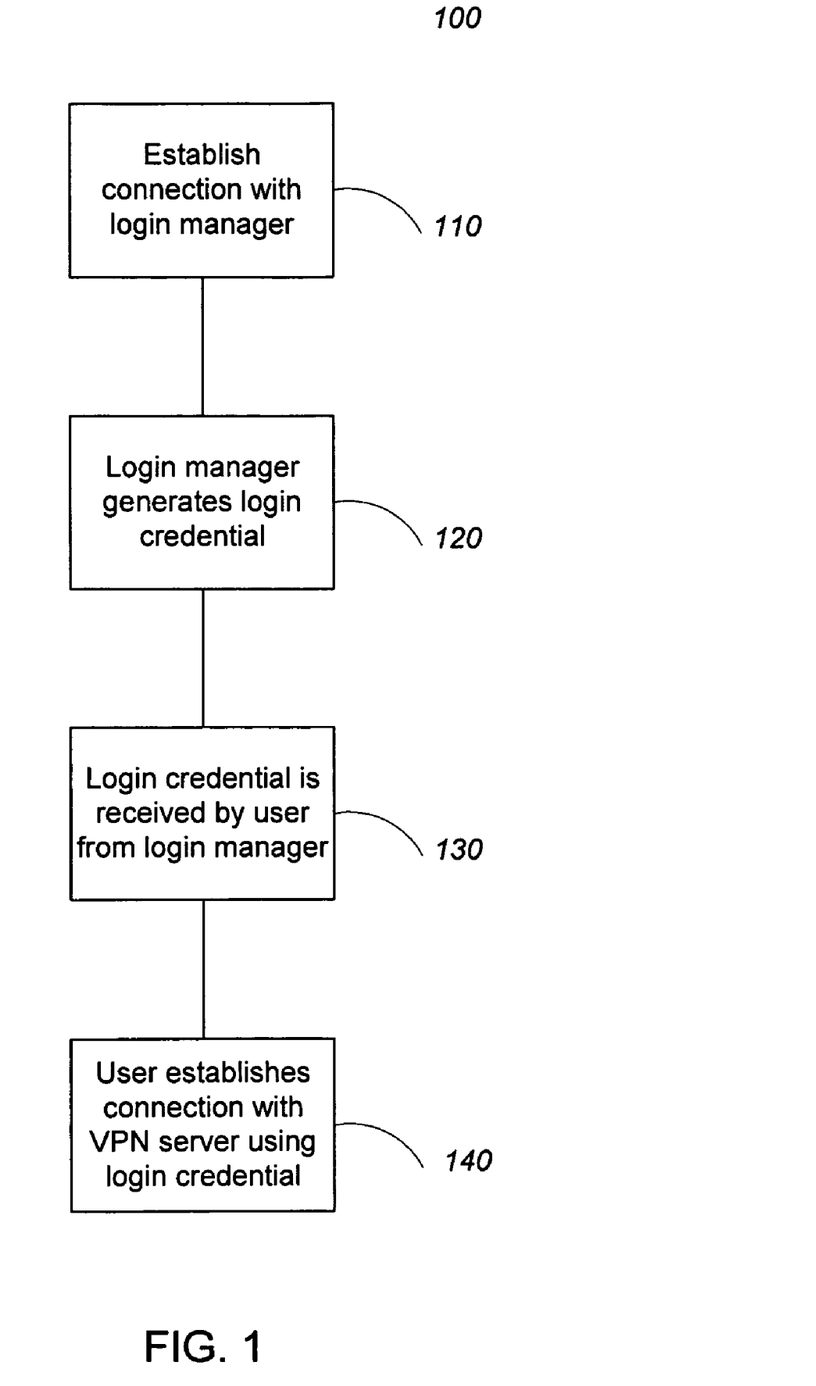
FIG. 1 is a flow chart illustrating a method for assigning login credentials to a user.

FIG. 1 shows a method 100 for assigning a login credentials to a user, for use with a virtual private network (VPN) server. The term "user" will be used, as is commonly done in the art, to refer to either an individual person, the computing device used by the person, or the two together. The required sense will be clear from the context.

Login credentials may consist of a username and password, or any other sort of identifying information, such as a unique user identifier. In one implementation, the VPN server may use the point-to-point tunneling protocol (PPTP); in an alternative implementation, the VPN server may use any other suitable protocol, e.g., IP security protocol (IPSec) or layer two tunneling protocol (L2TP).

First, the user establishes a connection from the user to a login manager of the VPN server (step 110). The login manager can be on the VPN server, or it can be on another server, as long as the other server has the ability to communicate with the VPN server. Any user may initiate contact with the login manager, and no identifying information needs to be passed to the login manager.

The connection between the user and the login manager may be secured by establishing a transport layer security (TLS) tunnel, or a secure sockets layer (SSL) tunnel. In order to establish the tunnel, the login manager transmits its certificate to the user, and the user uses the certificate to establish a symmetric key to encrypt communications between the login manager and the user. In an alternative implementation, the communications to the login manager may be secured using any appropriate alternative encryption method.

Once the connection is established between the user and the login manager, the login manager generates a login credential (step 120) in response to a request by the user. In one implementation, the login credential is randomly generated, e.g., by using a pseudo-random number generator, by the login manager or the VPN server. In one implementation, the login credential is long and arbitrary, making it very difficult for someone with malicious intent to guess it correctly. Further, since the set of valid login credentials is very sparse compared with the set of potential login credentials, it is highly unlikely that someone with malicious intent will even find a valid login credential. For example, if a login credential is made up of a 10 character alphanumeric phrase (letters being case independent), there are approximately $3.66 \times 10^{15}$ potential login credentials. If even one million of these potential login credentials are valid login credentials, the chance of choosing a single potential login credential at random and having it be a valid login credential is less than one in 3.6 billion.

The login credential need not be associated with the user by either the login manager or the VPN server. It is possible and advantageous, though not necessary, for the user to remain completely anonymous. The login manager generates a new login credential for every request received by the login manager. Therefore, if the same user makes a second request for a login credential, the login manager will assign a new login credential to the user.

The login credential is then received by the user from the login manager (step 130) over the established connection between the user and the login manager. Once the user receives the login credential, the connection between the user and the login manager may be terminated.

Next, the user establishes a connection with the VPN server, using the login credential that the user previously received (step 140). The connection between the user and the VPN server is encrypted, with the encryption key based on the login credential—each unique login credential will result in a unique encryption key. As the login credential is a shared secret between the VPN server/login manager and the user, both the user and the VPN server calculate the same symmetric encryption key based on the login credential assigned by the login manager. Once the user has established the connection with the VPN server, all further communications over this connection, in both directions, are also encrypted using the same encryption key based on the login credential.

Once the user has established the connection with the VPN server, the user can access any other servers that are connected to the VPN server over a wide area network (WAN). In one implementation, the user can access any server on the Internet through the VPN server. As described above, all communications between the user and the VPN server are encrypted.

In one implementation, the login credential can be set to expire after a length of time predetermined by the login manager. When the login credential expires, it can no longer be used to establish a connection with the VPN server. In an alternative implementation, the login credential expires immediately after it is first used by the user to log on to the VPN server.

In another implementation, when the login credential expires, if the user that logged on using the login credential is still logged into the VPN server, the user is logged off. In an alternative implementation, the user may remain logged on to the VPN server indefinitely, even after the login credential expires, but once the user is disconnected from the VPN server (either voluntarily or involuntarily), the user must obtain a new login credential. In an alternative implementation, the login credential can be used to login to the server for a pre-set number of times. After the user has logged in to the server for the number of times, the login credential can no longer be used.

In one implementation, the generation of the login credential can be linked to a billing system. In this implementation, a user can pre-pay for a specific length of access, e.g., one hour or one day (24 hours). Once the user's payment is verified, the user is provided with a login credential that is valid for the length of time the user purchased. At the predetermined time established when the user made the initial purchase, the login credential is set to expire. No record needs to be kept of the individual user by the login manager or VPN server beyond the expiration time of each login credential issued. Optionally, this implementation can provide for one-time credentials, so that a single credential can be used for only one login, and the user is required to return to the billing system for a new credential if the user needs to login to the server again.

Figure 2:
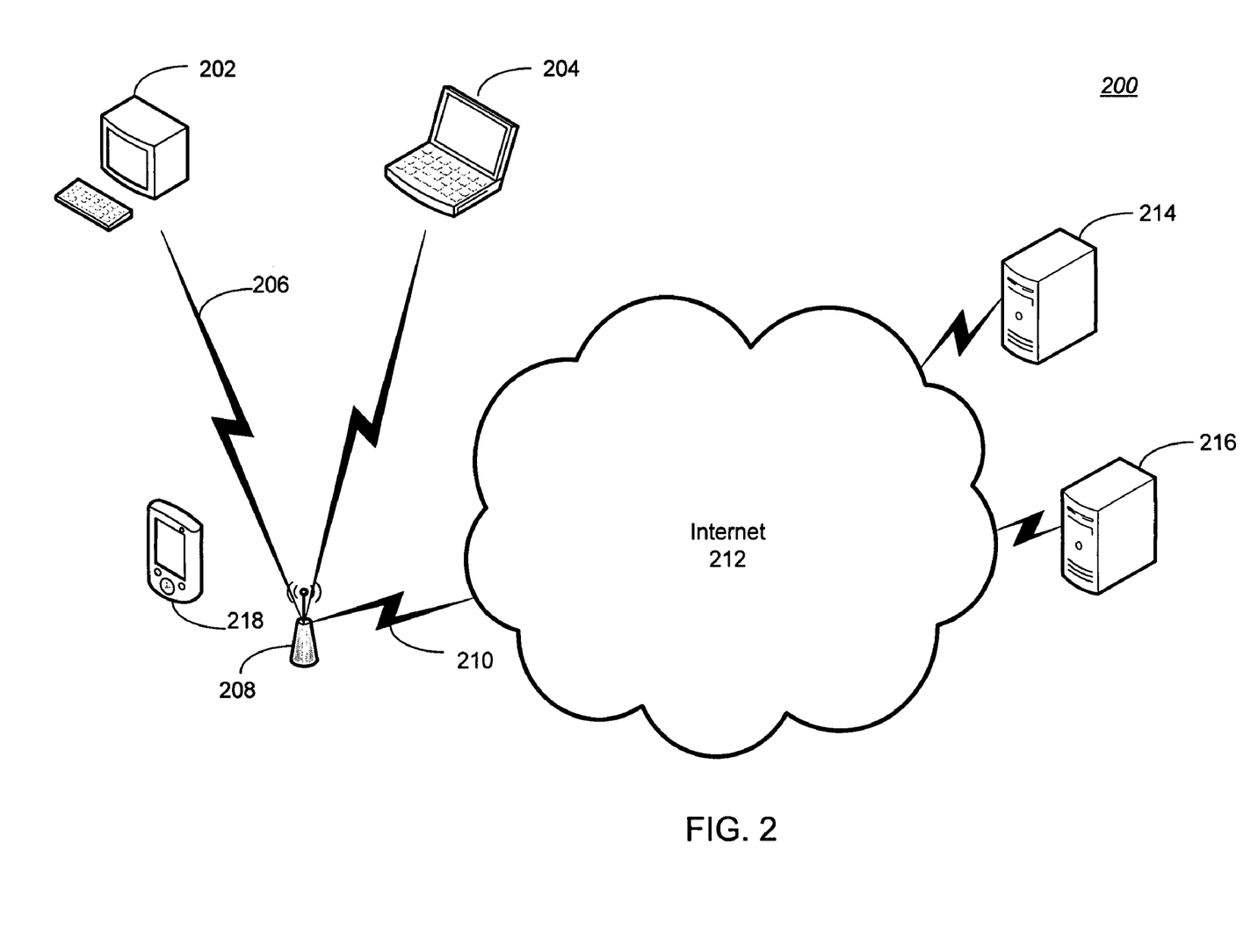
FIGS. 2-3 show a wide area network where one or more users are connecting to the network via a wireless access point.

The login credential can be used to protect communications across a wireless network connection and/or a malicious access point provider. FIG. 2 shows a configuration 200 where one or more users are connected to the Internet using a wireless network connection. Users 202, 204 establish a wireless network connection 206 with a wireless access point (AP) 208. The wireless network connection 206 uses radio frequency communication; for example, the IEEE 802.11g wireless networking standard operates on the 2.4 GHz frequency. The wireless AP 208 is also connected to the Internet 212. The users 202, 204 can access any other servers 214, 216 that are also connected to the Internet.

However, since wireless network connections typically use communication formats that are accessible to anyone within a range of the communication, e.g., radio waves or, to a lesser extent, infrared (IR) beams, a third party 218 with the necessary equipment is also able to receive any communications that are transmitted between the users 202, 204 and the wireless AP 208. In order to prevent the third party 218 from learning the contents of these communications, all communications between the users 202, 204 and the wireless AP 208 should be encrypted. If the communications are encrypted, the third party 218 is unable to determine the contents of the communications over the wireless network connection 206, even if the third party intercepts the communications. However, even if the communications between the users 202, 204 and the AP 208 are encrypted, the user's data packets can still be sniffed by the AP's provider after they have reached the AP, if the provider has malicious intent.

Figure 3:
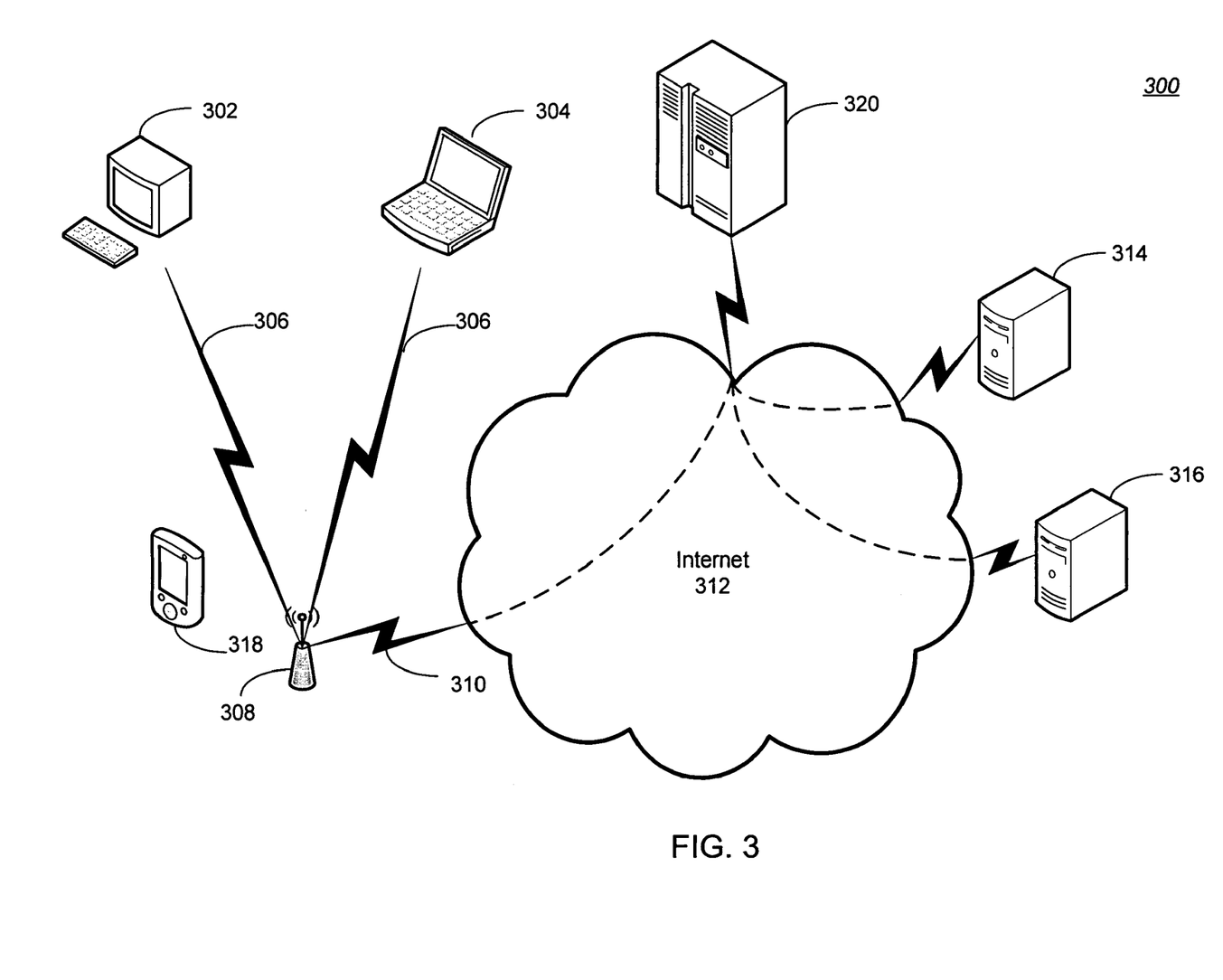

FIG. 3 shows a configuration 300 where users 302, 304 can establish a secure connection to the Internet using a wireless network connection 306 and a VPN server 320 that assigns a login credential to each user request. When the user 304 connects to the Internet, the communication is first transmitted over the wireless network connection 306 to a wireless AP 308, which is connected to the Internet 312. The communication is then transmitted to the VPN server 320. As described above, these initial communications between the user 304 and the VPN server 320 may be secured by establishing a TLS tunnel or a SSL tunnel, which provides encryption from the user all the way to the VPN server.

The login manager component of the VPN server 320 then assigns a login credential to the user 304, and sends the login credential as has been described above. Once the user 304 receives the login credential, the user 304 can establish a new connection with the VPN server 320 by logging in using the login credential. The login credential is also used to generate a unique encryption key. As a different login credential is assigned in response to each request made by a user, the user 304 receives a different login credential, and therefore generates a different encryption key, than every other user 302. Therefore, no other users, third parties, or the provider of the wireless AP 308 can determine the content of the communications sent to and from user 304 over the wireless network connection 306.

Once the user 304 has obtained the login credential and has established the second connection with the VPN server 320, the user can access multiple servers 314, 316 over the Internet 312 by connecting through the VPN server 320.

Since the login credential is generated by the login manager each time a user requests login credentials, the login manager and the VPN server need not maintain any resources or other records of each individual user that logs in to the VPN server. In one implementation, users can remain completely anonymous.

In an alternative implementation, the expiration time of the login credential, the number of allowed logins for the login credential, or another policy regarding the login credential, can be embedded into the login credential itself, and protected by the server's digital signature. For example, the login manager may append an expiration time (or the number of allowed logins) to the login credential. The login manager then signs the expiration time information using its private key based on a standard Digital Signature Algorithm (DSA), and appends the signature to the login credential, so that both the expiration time and the signature are appended to the login credential. When the user logs into the server, the user must present the login credential with the expiration time and the signature. The server is able to check the expiration time and its authenticity by verifying the signature. For example, if the user tampers with the expiration time, the signature verification will fail, and the user will not be permitted to login to the server. In one implementation, in the case where a login credential can be used a certain number of times before it expires, the user will receive a new login credential from the server each time the user logs in to the server. The new login credential will have the number of allowed logins decreased by one. Each login credential will be signed as described above. In this situation, the user will not receive a new signed login credential when the number of allowed logins is depleted.

Figure 4:
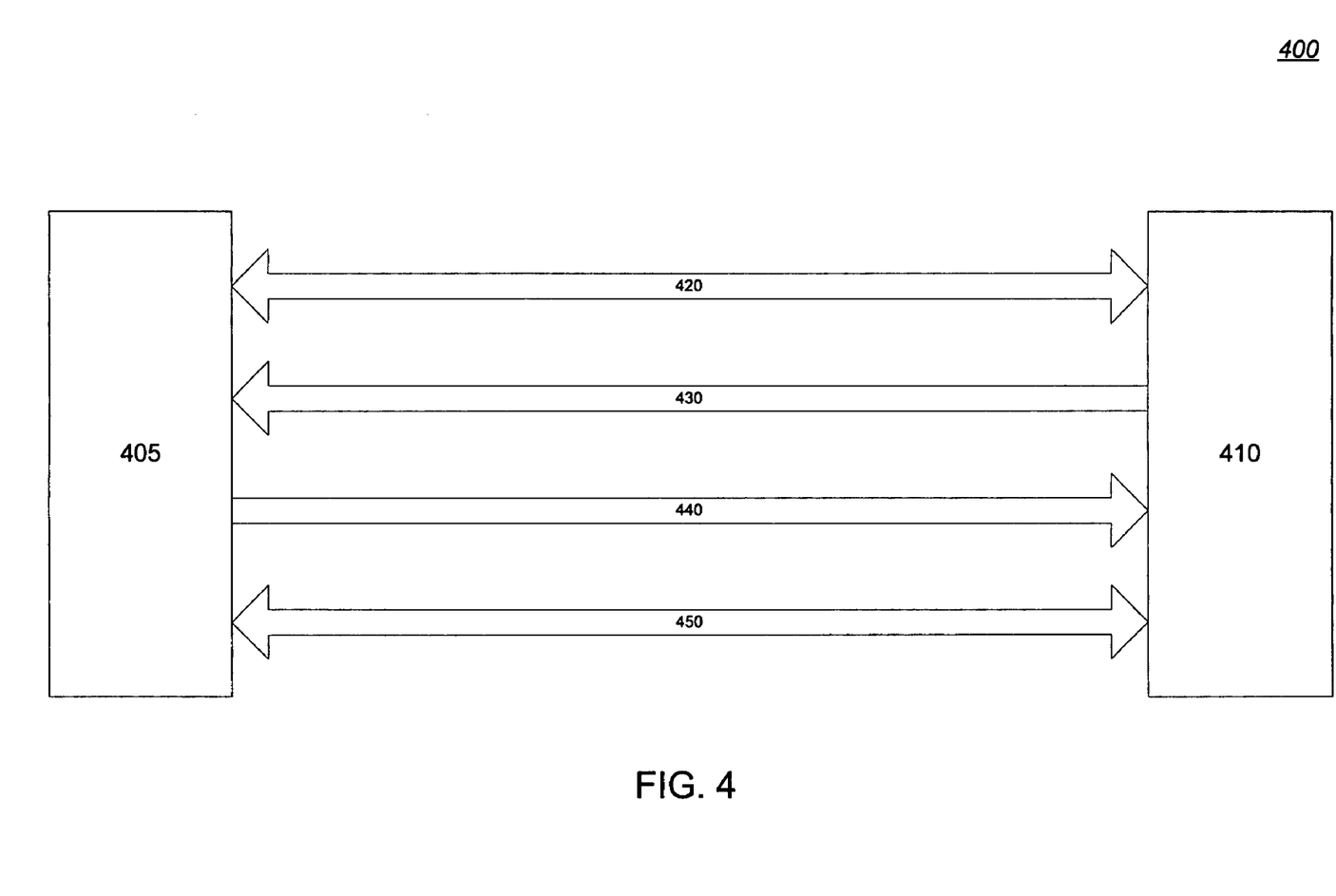
FIG. 4 shows the use of login credentials to secure communications between an unidentified user and a server.

FIG. 4 shows the use 400 of a login credential in any situation where secure communications are desired between a client and a server, but the identity of the individual clients is either not required or not desired for reasons of confidentiality (e.g., for implementing a secure anonymous file transfer protocol (FTP) service). The client 405 first establishes a connection (420) with the login manager of the server 410. As above, this connection can be established using a TLS tunnel or a SSL tunnel, in order to provide security for the transmission of the login credential. Next, the login manager of the server 410 transmits (430) a login credential that it has generated to the client 405. The client 405 then uses this login credential to create an encryption key while it logs in (440) to the server 410. As the login credential is a shared secret between the server and the client, both the server and the client calculate the same symmetric encryption key based on the assigned login credential. All further communications (450) between the client 405 and the server 410, are encrypted using the encryption key. As above, a different login credential is assigned to each client request, and therefore a different encryption key is generated for each client.

Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Particular embodiments of the invention have been described. Other embodiments are within the scope of the following claims. For example, the actions recited in the claims can be performed in a different order and still achieve desirable results. The policy regarding the validity of the login credential can be varied to fit special requirements of the service. The policy of the login credential, such as its expiration time and the number of allowed logins, can be embedded into the login credential itself by the way of digital signatures. Further, the login manager can be extended to include a "gate-keeper" that sits in front of the server and decides whether to forward user's data packets to the server, which can effectively transform a non-secure free service into a secure fee-charging service.

What is claimed is:

1. A method comprising:

receiving in a user computer a certificate from a virtual private network (VPN) server;

establishing a first secure connection between the user computer and the VPN server using a Transport Layer Security (TLS) protocol based on the certificate provided by the VPN server;

in the user computer, receiving over the first secure connection from the VPN server a login credential including a username and a password to login to the VPN server, the username and the password having been generated by the VPN server and without any identifying information provided to the VPN server;

calculating a secret encryption key based on the username and the password;

establishing a second secure connection with the VPN server using a Point-to-Point Tunneling Protocol (PPTP) tunnel based on the username and the password and the secret encryption key;

logging in to the VPN server over the second secure connection using the username and the password; and maintaining the second secure connection indefinitely, even after the login credential expires.

2. A method comprising:

on a server computer, receiving an anonymous request from a user computer to establish a first secure connection, the request including no identifying information of a user of the user computer;

establishing the first secure connection between the server computer and the user computer using a Transport Layer Security (TLS) protocol;

sending over the first secure connection to the user computer a username and a password, without using any identifying information identifying the user;

receiving a login request containing the username and the password from the user computer;

providing a distinct second secure connection between the server computer and the user computer using a Point-to-Point Tunneling Protocol (PPTP) tunnel based on the username and the password;

on the server computer, receiving encrypted communications from the client computer over the second secure connection;

sending encrypted communications to the client computer over the second secure connection; and maintaining the second secure connection indefinitely, even after the user name and the password expire.

3. The method of claim 2, wherein the username and password can only be used a predetermined number of times.

4. The method of claim 3, wherein the number of times is protected by a digital signature of the server computer.

5. The method of claim 2, wherein the username and password are purchased.

6. The method of claim 2, wherein the username and password are assigned a set expiration time.

7. The method of claim 2, further comprising verifying a purchase of the username and password.

8. A method comprising:

on a server computer, receiving an anonymous request from a user computer to establish a first secure connection, the request including no identifying information of a user of the user computer, wherein the server computer is a virtual private network (VPN) server;

establishing the first secure connection between the server computer and the user computer using a Transport Layer Security (TLS) protocol or a Secure Sockets Layer (SSL) protocol;

generating a username and a password without using andy information identifying the user;

sending over the first secure connection to the user computer the username and the password;

receiving a login request containg the username and the password from the user computer;

providubg a distinct second secure connection between the server computer and the user computer based on the username and the password; and maintaining the second secure connection indefinitely, even after the user name and the password expire.

9. The method of claim 8, wherein the username and the password are randomly generated.

10. The method of claim 8, wherein the username and password can only be used a predetermined number of times.

11. The method of claim 10, wherein the number of times is protected by a digital signature of the server computer.

12. The method of claim 8, wherein the username and password are purchased.

13. The method of claim 8, wherein the VPN server uses a Point-to-Point Tunneling Protocol (PPTP).

14. The method of claim 8, wherein the username and password are assigned a set expiration time.

15. The method of claim 8, further comprising verifying a purchase of the username and password.

* * * * *

UNITED STATES PATENT AND TRADEMARK OFFICE
CERTIFICATE OF CORRECTION

| | |
|---|---|
| PATENT NO. | : 7,661,128 B2 |
| APPLICATION NO. | : 11/096432 |
| DATED | : February 9, 2010 |
| INVENTOR(S) | : Kai Chen and Shioupyn Shen |

It is certified that error appears in the above-identified patent and that said Letters Patent is hereby corrected as shown below:

Column 10, Line 11 at Claim 8; replace:
"generating a username and a password without using andy" with
-- generating a username and a password without using any --

Column 10, Line 15 at Claim 8; replace:
"receiving a login request contaning the username and the" with
-- receiving a login request containing the username and the --

Column 10, Line 17 at Claim 8; replace:
"providubg a distinct second secure connection between the" with
-- providing a distinct second secure connection between the --

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO.      : 7,661,128 B2  
APPLICATION NO. : 11/096432  
DATED           : February 9, 2010  
INVENTOR(S)     : Chen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1327 days.

Signed and Sealed this

Twenty-eighth Day of December, 2010

David J. Kappos
*Director of the United States Patent and Trademark Office*